United States Patent
Mastrototaro et al.

(10) Patent No.: US 11,764,639 B2
(45) Date of Patent: Sep. 19, 2023

(54) BEARING CAP AND ELECTRIC MOTOR UTILIZING THE SAME

(71) Applicant: Johnson Electric International AG, Murten (CH)

(72) Inventors: Marco Mastrototaro, Volpiano (IT); Nicola Re, Rivalta (IT)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 256 days.

(21) Appl. No.: 17/208,821

(22) Filed: Mar. 22, 2021

(65) Prior Publication Data
US 2021/0234426 A1    Jul. 29, 2021

Related U.S. Application Data

(63) Continuation of application No. PCT/EP2019/075301, filed on Sep. 20, 2019.

(30) Foreign Application Priority Data

Sep. 20, 2018 (IT) .................. 102018000008754

(51) Int. Cl.
| H02K 5/10 | (2006.01) |
| H02K 5/173 | (2006.01) |
| H02K 11/30 | (2016.01) |
| B60H 1/00 | (2006.01) |
| H02K 7/08 | (2006.01) |
| H02K 21/22 | (2006.01) |

(52) U.S. Cl.
CPC ....... *H02K 5/1735* (2013.01); *B60H 1/00521* (2013.01); *H02K 5/10* (2013.01); *H02K 7/085* (2013.01); *H02K 11/30* (2016.01); *H02K 21/22* (2013.01); *H02K 2211/03* (2013.01)

(58) Field of Classification Search
CPC ......... H02K 5/10; H02K 5/1735; H02K 7/085
See application file for complete search history.

(56) References Cited

U.S. PATENT DOCUMENTS

| 5,396,134 | A | * | 3/1995 | Mochizuki | ............ | H02K 5/124 310/90 |
| 5,610,462 | A | * | 3/1997 | Takahashi | ............ | H02K 5/1675 310/90 |
| 7,659,649 | B2 | * | 2/2010 | Lin | ............ | H02K 7/085 310/67 R |
| 2006/0119200 | A1 | | 6/2006 | Chin-Long et al. | | |
| 2014/0211343 | A1 | | 7/2014 | Kodama | | |
| 2015/0288237 | A1 | | 10/2015 | Horng et al. | | |

FOREIGN PATENT DOCUMENTS

DE    102016015365 A1    6/2018

* cited by examiner

*Primary Examiner* — Dang D Le
(74) *Attorney, Agent, or Firm* — Aird & McBurney LP

(57) ABSTRACT

The invention relates to a bearing cap (10) and an electric motor (M) utilizing the same. The bearing cap (10) has a first annular protrusion (18) configured for fixing to a corresponding annular groove (27) of an axial end of the bearing seat (13) by an adhesive. The first annular protrusion (18) has a plurality of first cuts (28). With the bearing cap (10), sand or other impurities can be prevented from entering the bearing seat (13).

20 Claims, 3 Drawing Sheets

US 11,764,639 B2

BEARING CAP AND ELECTRIC MOTOR UTILIZING THE SAME

TECHNICAL FIELD

The invention relates to the field of motor technology, in particular to a bearing cap and an electric motor utilizing the same, and more particularly to a brushless direct current (DC) motor for driving a cooling fan of an automobile.

BACKGROUND

The electric motor, especially a brushless DC motor, generally includes a stator core, a rotor, a supporting member and an electronic chamber. The supporting member includes a bearing seat extending along an axial direction, and a supporting wall extending radially outward from an end of the bearing seat. The stator core is fixed to an outside of the bearing seat. Two ball bearings are fixed to the bearing seat. A shaft of the rotor is rotatably mounted into the bearing seat via the two ball bearings. A housing of the rotor is fixed to an end of the shaft, and surrounds the stator core. The electronic chamber is a separate assembly, including a top cover, a bottom cover and a plurality of electronic components. The top cover and the bottom cover define an enclosed space for housing the electronic components. The bottom cover is fixed to the supporting wall of the supporting member.

However, a gap is presented between the supporting wall and the bottom cover of the electronic chamber. Once sand or other impurities enters into the bearing seat and affects the functioning of the ball bearing, it is easy to cause the shaft to stall.

SUMMARY

It is the object of the present invention to provide a bearing cap which is capable to solve the above problem, and further to provide an electric motor utilizing the bearing cap.

According to one aspect of the present invention, a bearing cap is provided. A surface of the bearing cap has a first annular protrusion configured for fixing to a corresponding annular groove of an axial end of the bearing seat by an adhesive, and the first annular protrusion has a plurality of first cuts.

According to another aspect of the present invention, a electric motor is provided. The electric motor includes a rotor, a stator, and a supporting member having a bearing seat extending along an axial direction and at least one bearing fixed to the bearing seat. A shaft of the rotor is rotatable mounted into the bearing seat via the at least one bearing. An axial end of the bearing seat has an annular groove. The electric motor further includes the above described bearing cap.

The present invention provides a bearing cap which can be stably mounted to the axial end of the bearing seat. Therefore, sand or other impurities are prevented from entering the bearing seat.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE EMBODIMENTS

Figure 1:
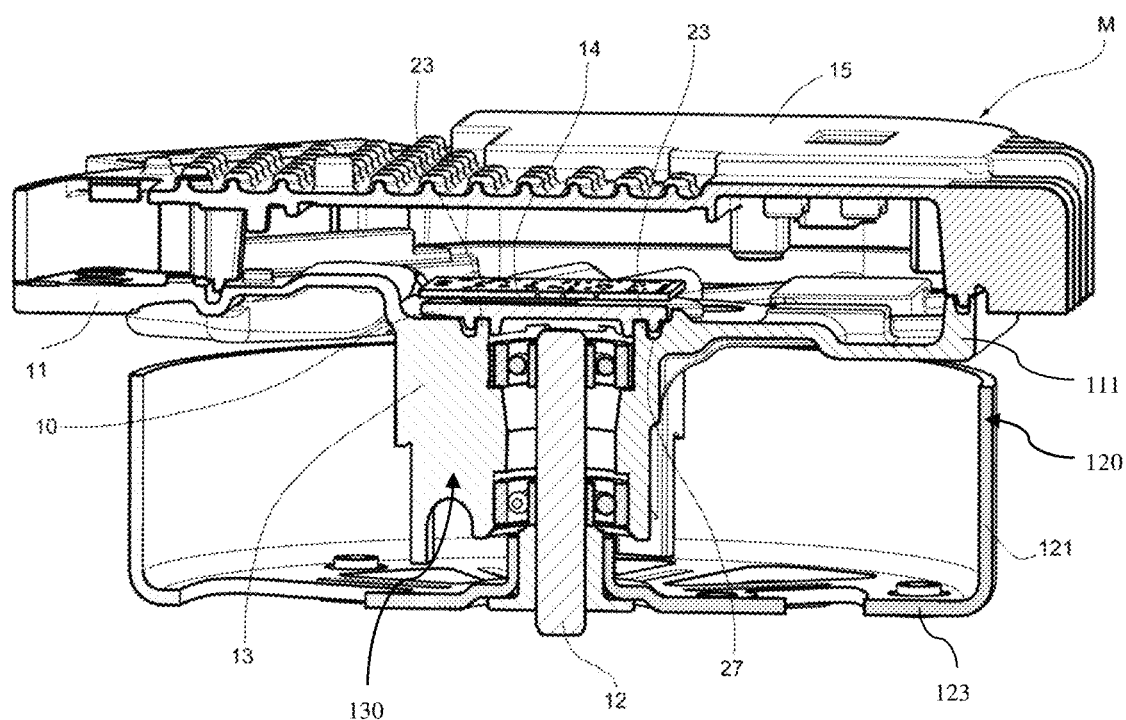
FIG. 1 shows a longitudinal cross section of a part of an electric motor according to a preferred embodiment of the present invention.

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the invention. The dimensions shown in the drawings are only for convenience of illustration and are not intended to be limiting.

Figure 2:
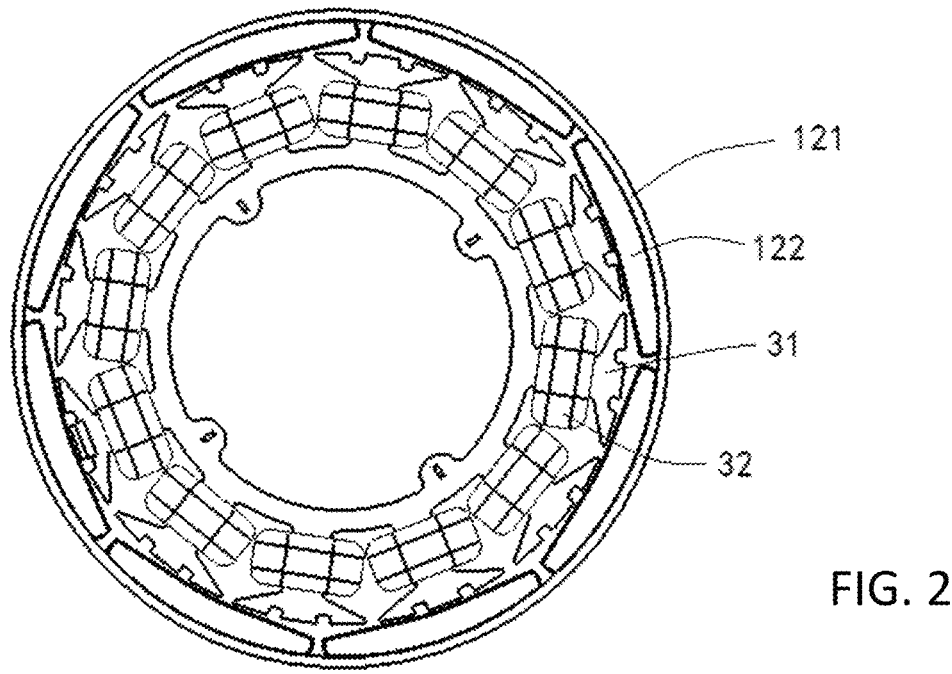
FIG. 2 shows a transverse cross section of a part of a stator and a rotor of the motor shown in FIG. 1.

Referring to FIGS. 1 to 2, an electric motor M according to a preferred embodiment of the present invention includes a rotor, a stator, a supporting member 130, a circuit module, and a sealing cover 15. In the embodiment, the electric motor M is a brushless DC motor, preferably an outer rotor brushless motor for driving a cooling fan of an automobile.

The rotor includes a shaft 12, a housing 120, and a plurality of permanent magnets 122. The housing 120 includes a covering portion 123 and a surrounding portion 121. The covering portion 123 is circular disc-shaped and fixedly attached around an end of the shaft 12. The surrounding portion 121 extends from an outer periphery of the cover portion 123 along an axial direction of the motor M, and cooperates with the covering portion 123 to define a cylindrical accommodation. The permanent magnets 122 are fixed to an inner surface of the surrounding portion 121 and evenly spaced along a circumferential direction of the housing 120.

The stator is housed in the accommodation of the housing 120, and faces the permanent magnets 122 of the rotor. The stator is spaced from the covering portion 123 of the housing 120, so that the rotor is rotatable relative to the stator. The stator includes a stator core 31, a plurality of windings 32 wound around the stator core 31, and an insulating bracket (not shown) disposed between the stator core 31 and the stator windings 32.

The supporting member 130 is preferably made from a thermally conductive material such as cast-aluminum, including a bearing seat 13 extending along the axial direction and a supporting wall 11 extending radially outward from an outer periphery of an axial end of the bearing seat 13. The bearing seat 13 has a cylindrical opening inside, which is mounted with a bearing, preferably two ball bearings arranged in the axial direction. The shaft 12 is rotatably mounted inside the bearing seat 13 via the bearing. The bearing seat 13 of the supporting member 130 is received within the stator core 31. The supporting wall 11 of the supporting member 130 is located outside the accommodation of the rotor, and spaced from axial ends of the surrounding portion 121 and the stator in the axial direction.

Figure 3:
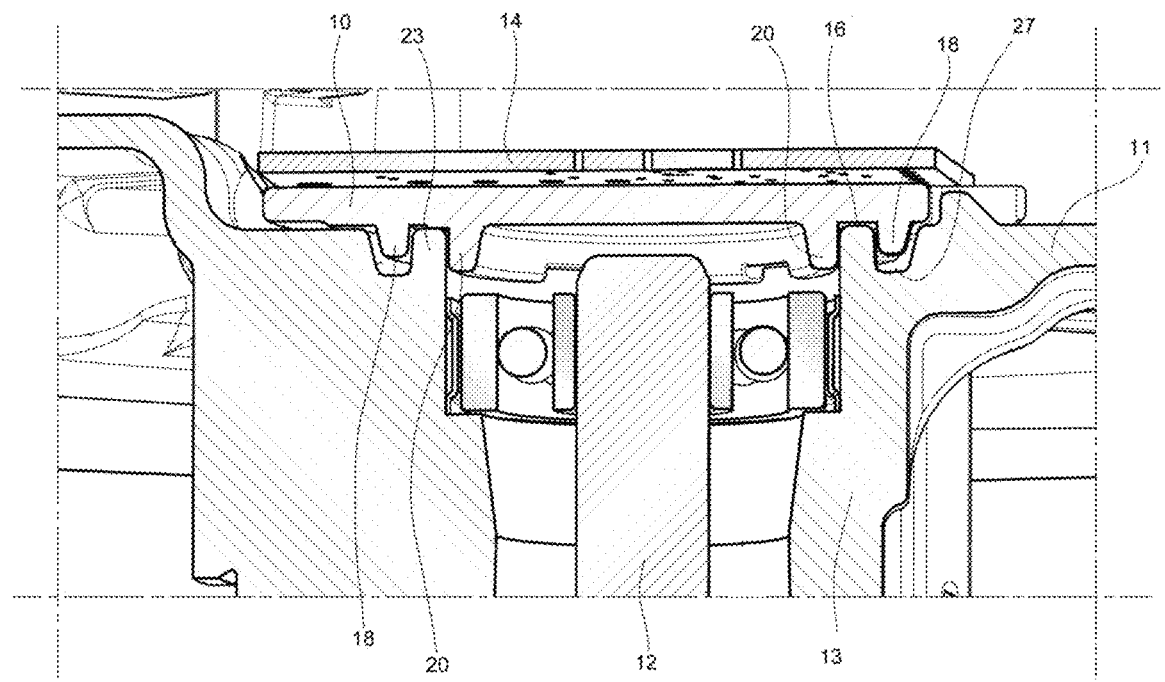
FIG. 3 is a partial enlarged view of the motor shown in FIG. 1.
Figure 4:
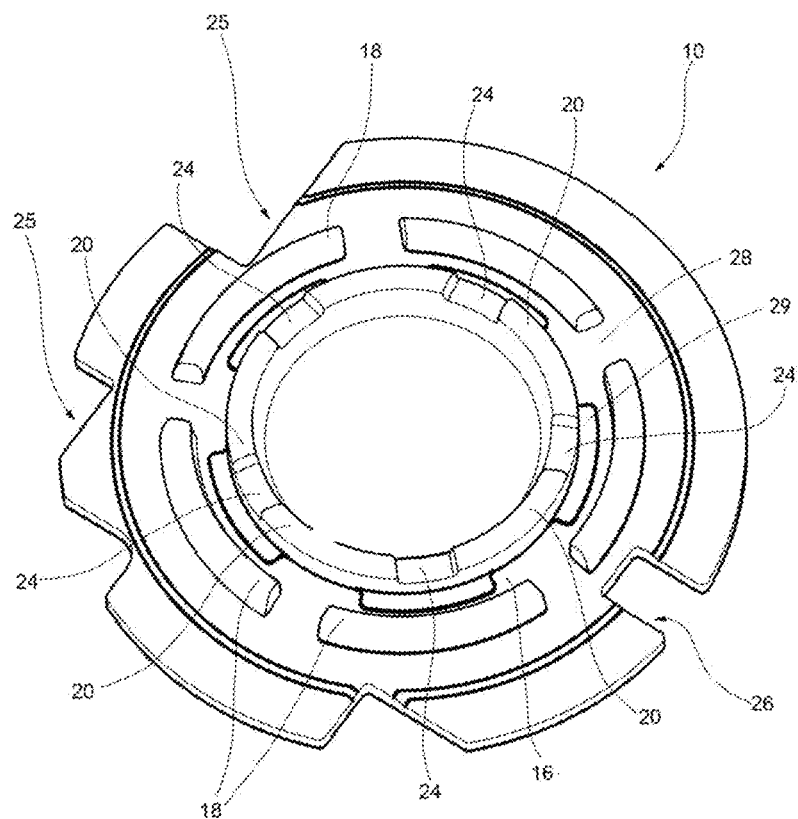
FIG. 4 shows a perspective representation of a bearing cap of the motor shown in FIG. 1.
Figure 5:
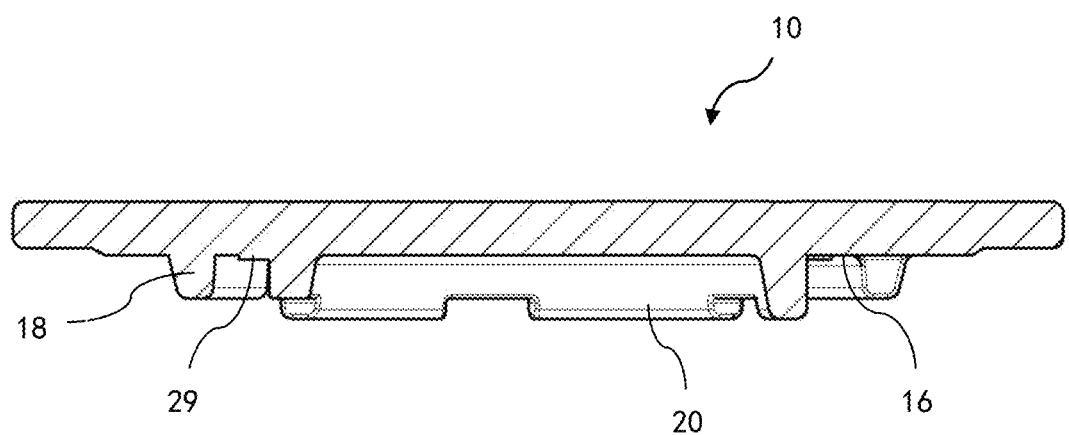
FIG. 5 is an enlarged cross section of the bearing shown in FIG. 4.

Further referring to FIGS. 3 to 5, a bearing cap 10 is mounted to an axial end of the bearing seat 13, for sealing the cylindrical opening. In the embodiment, the bearing cap 10 is clearance-fitted to the axial end of the bearing seat 13, and is fixed to the bearing seat 13 by an adhesive. The bearing cap may be made from a metallic material, preferably aluminum.

An annular groove 27 is formed on the axial end of the bearing seat 13. A surface 16 of the bearing cap 10 facing the axial end of the bearing seat 13 has a first annular protrusion 18. The annular protrusion 18 has a cross section smaller than that of the annular groove 27, and is fixed to the annular groove 27 by the adhesive. In the embodiment, a plurality of first cuts 28 are formed on an axial end surface of the first annular protrusion 18. Preferably, an axial depth of the first cuts 28 is equal to an axial height of the first annular protrusion 18 to cut the first annular protrusion 18 into a plurality of separated arc protrusions. In an alternative embodiment, the axial depth of the first cuts 28 also may be less than the axial height of the first annular protrusion 18, so that the first annular protrusion 18 is continuous in the circumferential direction.

An adhesive which may be made from a resin material is disposed in the annular groove 27 when mounting the bearing cap 10. The first cuts 28 of the first annular protrusion are configured to facilitate an air discharge in the bearing seat 13, so to release air pressure in the bearing seat 13 and to prevent the formation of air bubbles in the adhesive, and thus preventing the bearing cap 10 from dropping off from the bearing seat 13, especially when the adhesive has not hardened yet.

Preferably, at least one projection 29 is formed on the surface 16 of the bearing cap 10. The at least one projection 29 is arranged at radial inner side or radial outer side of the first annular protrusion 18. The at least one projection 29 protrudes slightly from the surface 16 of the bearing cap 10. That is, an axial height of the at least one projection 29 is much smaller than the axial height of the first annular protrusion 18. Therefore, the at least one projection 29 contacts the axial end of the bearing seat 13, and a gap is formed between the surface 16 of the bearing cap 10 other than the at least one projection 29, and the axial end of the bearing seat 13. The gap is configured to further facilitate the release of the air pressure in the bearing seat 13. The at least one projection 29 can be a plurality of projections 29 which are evenly spaced along the circumferential direction. In the circumferential direction, each projection 29 is corresponding to a position between two adjacent first cuts 28 of the first annular protrusion 18.

Preferably, the surface 16 of the bearing cap 10 further includes a second annular protrusion 20. The second annular protrusion 20 is arranged at radial inner side of the first annular protrusion 18 and the at least one projection 29. An outer diameter of the second annular protrusion 20 is slightly smaller than an inner diameter of the bearing seat 13, so that the second annular protrusion 20 is clearance-fitted to the cylindrical opening of the bearing seat 13. A plurality of second cuts 24 are formed on an axial end surface of the second annular protrusion 20. Preferably, an axial depth of the second cuts 24 is smaller than an axial height of the second annular protrusion 20, so that the second annular protrusion 20 is continuous in the circumferential direction. In an alternative embodiment, the axial depth of the second cuts 24 also may be equal to the axial height of the second annular protrusion 20 to cut the second annular protrusion 20 into a plurality of separated arc protrusions. The second cuts 24 are configured to further facilitate the release of the air pressure in the bearing seat 13.

An annular recess (not labeled) is defined between the first annular protrusion 18 and the second annular protrusion 20. An annular rib 23 is formed between the groove 27 and the cylindrical opening to engage the annular recess.

Preferably, a circumference of the first annular protrusion 18 is concentric with a circumference of the second annular protrusion 20. The first cuts 28 and the second cuts 24 are staggered in the circumferential direction, so that air in the bearing seat 13 can be discharged more efficiently. The first cuts 28 and the second cuts 24 are evenly disposed in the circumferential direction. The number of the first cuts 28 is equal to the number of the second cuts 24. In the circumferential direction, each second cut 24 is substantially corresponding to a central position between two adjacent first cuts 28. The axial height of the first annular protrusion 18 is smaller than the axial height of the second annular protrusion 20, and is smaller than an axial depth of the annular groove 27.

The circuit module includes a plurality of electronic components (not shown), and a circuit board 14 connected to at least part of the electronic components. The circuit board 14 is placed on the bearing cap 10. Preferably, a thermal conductive adhesive is disposed between the circuit board 14 and the bearing cap 10 for facilitating heat dissipation of the circuit board 14.

Preferably, an outer periphery of the bearing cap 10 has at least one avoidance groove 25 to prevent it from coming into contact with the electronic components or any electrical terminals of the circuit board 14, thereby avoiding potential short circuits. The outer periphery of the bearing cap 10 further has a positioning groove 26, which is configured to engage a positioning post (not shown) provided on the supporting wall 11 of the supporting member 130, so that the bearing cap 10 can be positioned correctly in the circumferential direction.

The sealing cover 15 and the supporting wall 11 mounted with the bearing cap 10 define an enclosed chamber to house the circuit module. The sealing cover 15 is preferably made from a thermally conductive material such as cast-aluminum.

It should be understood that an outer periphery of the supporting wall 11 and an outer periphery of the sealing cover 15 may directly cooperate with each other to form the enclosed chamber, or may form the enclosed chamber together with another member located therebetween. For example, the motor M may further include a frame (not shown) for supporting the electronic components. In some embodiments, the whole outer periphery of the frame is tightly connected between the outer periphery of the supporting wall 11 and the outer periphery of the sealing cover 15. In some other embodiments, a portion of the frame is arranged within the enclosed chamber, and another portion of the frame is tightly connected between the outer periphery of the supporting wall 11 and the outer periphery of the sealing cover 15.

The present invention provides a bearing cap 10, which can be stably mounted to the axial end of the bearing seat 13 of the supporting member 130. Therefore, sand or other impurities are prevented from entering the bearing seat 13.

Furthermore, the sealing cover 15 and the supporting wall 11 mounted with the bearing cap 10 define the enclosed chamber to house the circuit module, so the traditional bottom cover for the electronic chamber is no longer required, thereby effectively reducing the cost of the motor M.

Although certain inventive embodiments of the present disclosure have been specifically described, the present disclosure is not to be construed as being limited thereto. Various changes or modifications may be made to the present disclosure without departing from the scope and spirit of the present disclosure.

The invention claimed is:

1. A bearing cap (10) for sealing a bearing seat (13), wherein a surface of the bearing cap (10) has a first annular protrusion (18) configured for fixing to a corresponding annular groove (27) at an axial end of the bearing seat (13) by an adhesive, and the first annular protrusion (18) has a plurality of first cuts (28) for facilitating an air discharge from the bearing seat (13) when the bearing cap (10) is fixed to the bearing seat (13), the surface (16) of the bearing cap (10) further has a second annular protrusion (20) which is arranged at a radial inner side of the first annular protrusion (18) and configured to be placed in the bearing seat (13), and the second annular protrusion (20) has a plurality of second cuts (24) which are formed on an axial end surface of the second annular protrusion (20).

2. The bearing cap (10) according to claim 1, wherein the bearing cap (10) is made from metallic material, the first cuts (28) are formed on an axial end surface of the first annular protrusion (18) and evenly disposed in a circumferential direction, and the first annular protrusion (18) is cut into a plurality of separated arc protrusions by the first cuts (28).

3. The bearing cap (10) according to claim 1, wherein the surface (16) of the bearing cap (10) further has at least one projection (29) which is arranged at a radial inner side or radial outer side of the first annular protrusion (18) and configured for contacting the axial end of the bearing seat (13), and an axial height of the at least one projection (29) is smaller than an axial height of the first annular protrusion (18).

4. The bearing cap (10) according to claim 3, wherein in a circumferential direction, the at least one projection (29) is corresponding to a position between two adjacent first cuts (28) of the first annular protrusion (18).

5. The bearing cap (10) according to claim 1, wherein the first cuts (28) are formed on an axial end surface of the first annular protrusion (18) and disposed in a circumferential direction.

6. The bearing cap (10) according to claim 1, wherein a circumference of the first annular protrusion (18) is concentric with a circumference of the second annular protrusion (20), and the first cuts (28) and the second cuts (24) are staggered in a circumferential direction.

7. The bearing cap (10) according to claim 6, wherein the number of the first cuts (28) is equal to the number of the second cuts (24), and in the circumferential direction, each second cut (24) is substantially corresponding to a central position between two adjacent first cuts (28).

8. The bearing cap (10) according to claim 1, wherein an axial height of the first annular protrusion (18) is smaller than an axial height of the second annular protrusion (20).

9. The bearing cap (10) according to claim 1, wherein an outer periphery of the bearing cap (10) has a positioning groove (26), for positioning the bearing cap (10) in a circumferential direction.

10. An electric motor (M) comprising a rotor, a stator, and a supporting member (130) which comprises a bearing seat (13) extending along an axial direction and at least one bearing fixed to the bearing seat (13), a shaft (12) of the rotor being rotatably mounted into the bearing seat (13) via the at least one bearing; characterized in that an axial end of the bearing seat (13) has an annular groove (27), and the electric motor (M) further comprises a bearing cap (10) for sealing the bearing seat (13), a surface of the bearing cap (10) has a first annular protrusion (18) fixed to the annular groove (27) by an adhesive, and the first annular protrusion (18) has a plurality of first cuts (28) for facilitating an air discharge from the bearing seat (13) when the bearing cap (10) is fixed to the bearing seat (13).

11. The electric motor according to claim 10, wherein the bearing seat (13) has a cylindrical opening for mounting the at least one bearing, and an annular rib (23) is formed between the annular groove (27) and the cylindrical opening in a radial direction of the bearing seat (13).

12. The electric motor (M) according to claim 10, wherein the at least one bearing is a ball bearing, the electric motor (M) is a brushless DC motor which further comprises a circuit module and a sealing cover (15), the supporting member (130) further comprises a supporting wall (11) extending radially outward from an outer periphery of an axial end of the bearing seat (13), and the sealing cover (15) and the supporting wall (11) with the bearing cap (10) define an enclosed chamber to house the circuit module.

13. The electric motor according to claim 12, wherein the bearing cap (10) is made from metallic material, the circuit module comprises a circuit board (14) which is placed on the bearing cap (10), and a thermal conductive adhesive is disposed between the circuit board (14) and the bearing cap (10).

14. The electric motor according to claim 12, wherein the circuit module comprises a plurality of electronic components and a frame for supporting the electronic components, the supporting wall (11), the sealing cover (15) and the frame therebetween define the enclosed chamber.

15. The electric motor according to claim 10, wherein an axial height of the first annular protrusion (18) is smaller than an axial depth of the annular groove (27).

16. The electric motor according to claim 10, wherein the first cuts (28) are formed on an axial end surface of the first annular protrusion (18) and disposed in a circumferential direction.

17. The electric motor according to claim 10, wherein the first cuts (28) are evenly disposed in a circumferential direction, and the first annular protrusion (18) is cut into a plurality of separated arc protrusions by the first cuts (28).

18. The electric motor according to claim 10, wherein the surface (16) of the bearing cap (10) further has a second annular protrusion (20) which is arranged at a radial inner side of the first annular protrusion (18) and configured to be placed in the bearing seat (13), and the second annular protrusion (20) has a plurality of second cuts (24) which are formed on an axial end surface of the second annular protrusion (20).

19. The electric motor according to claim 18, wherein the first cuts (28) and the second cuts (24) are staggered in a circumferential direction.

20. A bearing cap (10) for sealing a bearing seat (13), wherein a surface of the bearing cap (10) has a first annular protrusion (18) configured for fixing to a corresponding annular groove (27) at an axial end of the bearing seat (13) by an adhesive, and the first annular protrusion (18) has a plurality of first cuts (28) for facilitating an air discharge from the bearing seat (13) when the bearing cap (10) is fixed to the bearing seat (13), the surface (16) of the bearing cap (10) further has at least one projection (29) which is arranged at a radial inner side or radial outer side of the first annular protrusion (18) and configured for contacting the axial end of the bearing seat (13), and an axial height of the at least one projection (29) is smaller than an axial height of the first annular protrusion (18).

<p style="text-align:center">* * * * *</p>